United States Patent [19]

Franz et al.

[11] Patent Number: 4,482,389
[45] Date of Patent: Nov. 13, 1984

[54] NACREOUS PIGMENTS

[75] Inventors: Klaus-Dieter Franz, Kelkheim; Klaus Ambrosius, Frankfurt; Reiner Esselborn; Manfred Kieser, both of Darmstadt, all of Fed. Rep. of Germany

[73] Assignee: Merck Patent Gesellschaft mit Beschränkter Haftung, Darmstadt, Fed. Rep. of Germany

[21] Appl. No.: 534,869

[22] Filed: Sep. 22, 1983

[30] Foreign Application Priority Data

Sep. 22, 1982 [DE] Fed. Rep. of Germany ....... 3235017

[51] Int. Cl.$^3$ ............................................... C09C 1/28
[52] U.S. Cl. .................................. 106/291; 106/302; 106/304; 106/308 Q
[58] Field of Search ............ 106/291, 302, 304, 308 Q

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,331,699 | 7/1967 | Marshall et al. | 106/291 |
| 3,342,617 | 9/1967 | Jackson | 106/291 |
| 3,650,790 | 3/1972 | Klenke et al. | 106/291 |
| 3,832,208 | 8/1974 | Jackson | 106/308 Q |
| 3,926,659 | 12/1975 | Bernhard et al. | 106/291 |
| 4,134,776 | 1/1979 | Rieger et al. | 106/291 |

Primary Examiner—G. L. Kaplan
Attorney, Agent, or Firm—Millen & White

[57] ABSTRACT

Nacreous pigments which have improved stability to weathering and are based on mica flakes coated with metal oxides, are provided with a stabilizing, chromium-containing second coating which comprises a combination of metal salts. To form the second layer, iron and/or manganese are deposited on the starting pigments in the form of the hydroxide, carbonate or phosphate and chromium is deposited on the starting pigments in the form of the hydroxide, carbonate or phosphate or as methacrylato-chromium chloride. These are prepared by adding iron and/or manganese and chromium, in the form of salt solutions and at a pH of 2 to 8, to an aqueous suspension of a mica flake pigment coated with metal oxides, precipitating them on the mica flake pigments, and separating off these pigments and drying them.

14 Claims, No Drawings

NACREOUS PIGMENTS

BACKGROUND OF THE INVENTION

The present invention relates to nacreous pigments which have improved weathering stability and are based on mica flakes coated with metal oxides and also provided with a stabilizing, chromium-containing second coating.

It is known that plastics or lacquers into which nacreous pigments are incorporated undergo change as a result of weathering. In particular, the polymer matrix into which the pigments are embedded is also destroyed by the combined effect of UV radiation and moisture as a result of the catalytic influence of the mica platelets, which are usually coated with $TiO_2$.

Stability-improving coatings for pure titanium dioxide pigments are described in the literature, for example, in the book "Titanium," by J. Barksdale, Ronald-Press 1966. However, the coatings described therein are not sufficient to impart adequate stability to the $TiO_2$-containing coatings on mica which have a more complicated structure.

A second coating with chromium compounds has been proposed to improve the stability of mica pigments coated with $TiO_2$. Thus, mica pigments coated with $TiO_2$ have been additionally coated with methacrylatochromium chloride and exhibit an improved resistance to weathering (German Offenlegungsschrift No. 2,215,191). Mica pigments coated with $TiO_2$ have also been improved in respect of their resistance to weathering by an additional coating with chromium hydroxide (German Offenlegungsschrift No. 2,852,585).

However, the pigments after-treated in this manner have the disadvantage that the amounts of chromium compounds necessary to achieve an adequate effect have a severe adverse influence on the luster and color quality of the pigments because of their deep gray-green or green intrinsic color.

SUMMARY OF THE INVENTION

It is therefore an object of this invention to provide pigments with improved stability to weathering which do not have these disadvantages but have a good luster and pure colors even after the second coating.

Upon further study of the specification and appended claims, further objects and advantages of this invention will become apparent to those skilled in the art.

These objects have been attained based on the finding that a weather resistant coating of neutral color can be achieved, with retention of luster and color values, if the pigments to be stabilized are coated with a combination of metal compounds, i.e., the pigments being provided with a second coating of both a chromium compound and an iron and/or manganese compound.

This invention thus relates to nacreous pigments which have an improved stability to weathering and are based on mica chips coated with metal oxides and provided with a stabilizing, chromium-containing second coating, wherein the second coating comprises a combination of metal salts, with iron and/or manganese being deposited on the starting pigments in the form of the hydroxide, carbonate or phosphate and chromium being deposited on the starting pigments in the form of the hydroxide, carbonate or phosphate or as methacrylatochromium chloride.

This invention also relates to a process for the preparation of these pigments, wherein iron and/or manganese and chromium are added, in the form of salt solutions and at a pH value of 2 to 8, to an aqueous suspension of a mica flake pigment coated with metal oxides, then are precipitated on the mica flake pigments, and these are then separated off and dried.

DETAILED DISCUSSION

In principle, all conventional mica pigments coated with metal oxide are suitable as starting materials for the preparation of the pigments of this invention, but mica pigments coated with titanium dioxide are preferred. The mica flake base pigments are generally mica flakes which have a diameter of about 5–200 $\mu$m, are about 0.1–5 $\mu$m thick and are coated with a metal oxide layer. Because of their advantageous refractive index, titanium dioxide or titanium dioxide hydrates and/or zirconium dioxide or zirconium dioxide hydrates are chiefly used as the metal oxide coatings. However, it is also possible to use other colorless or, where relevant, colored metal oxides, such as, for example, $SnO_2$, $Al_2O_3$, or $Fe_2O_3$, together with these metal oxides or instead of them. An example of a pigment which is particularly frequently employed is a mica flake pigment in which mica flakes of about 5–50 $\mu$m in diameter and about 0.5 $\mu$m thick are uniformly coated with a layer of titanium dioxide, which may be hydrated, the mica surface carrying a $TiO_2$ layer of about 50–500 mg of $TiO_2$ per $m^2$. These nacreous pigments have various interference colors, depending on the thickness of the metal oxide layer precipitated. As a rule, they are products which are calcined at elevated temperatures of about 600°–1,000° C. All of these pigments are known, and they are described, for example, in German patent Specifications Nos. 1,467,468, 1,959,998 and 2,009,556 and German Offenlegungsschriften Nos. 2,060,850, 2,106,613, 2,214,545, 2,215,191, 2,244,298, 2,313,331, 2,313,332, 2,429,762, 2,522,572, 2,522,573 and 2,628,353. All of these disclosures are incorporated by reference herein. Particularly preferred starting materials are the mica pigments which have a $TiO_2$ coating in the rutile modification and can be prepared in accordance with German Offenlegungsschriften No. 2,214,545 or 2,522,572.

Other mica-based pigments are disclosed in commonly assigned U.S. applications Ser. Nos. (a) 421,684 of Sept. 22, 1982 and now U.S. Pat. No. 4,456,484; (b) 421,741 of Sept. 22, 1982 and now U.S. Pat. No. 4,456,486; (c) 436,861 of Oct. 26, 1982 and now U.S. Pat. No. 4,435,220; (d) 453,048 of Dec. 27, 1982; (e) 453,045 of Dec. 27, 1982; (f) 453,044 of Dec. 27, 1982; (g) 480,200 of Mar. 30, 1983; and (h) 501,461 of June 6, 1983, all of whose disclosures are incorporated by reference herein. These respectively disclose mica pigments having (a) a second layer of chromium and phosphate; (b) a second layer of chromium optionally deposited as chromium phosphate; (c) alkaline earths in the first oxide layer; (d) a second layer of manganese and optionally $SiO_2$; (e) $SiO_2$ and $Al_2O_3$ in the first oxide layer; (f) $SiO_2$ and optionally $Al_2O_3$ in addition to $Fe_2O_3$ in the first oxide layer; (g) a second layer of $Ti(SO_4)_2$; and (h) zirconium in the first oxide layer.

For the second coating of this invention, these known pigments are suspended in water. The metals to be deposited can then be added in the form of salt solutions and precipitated on the pigments by a suitable precipitating agent, such as, for example, a base or a suitable anion. In the preferred procedure, one or more solutions containing the metals in the form of a dissolved salt or complex are slowly added to the aqueous suspension of the starting pigment, the precipitating agent being metered in at the same time. The precipitation is carried out at a pH value of about 2–8, preferably about 4–7, this value being kept substantially constant during coating. The pH value largely depends on the form in which the metals are to be precipitated. Suitable precipitation forms are the hydroxides, the carbonates and the phosphates, and for chromium also the methacrylato complex. For the particularly preferred precipitation as phosphates, the suspension is brought to a pH value of, preferably, about 4–7.

In principle, all water-soluble salts of the cations can be used as the metal salts. The chlorides and sulfates are particularly preferred. In the case of iron, $FeSO_4$ is particularly preferred.

Since the metal solutions to be added to the suspension are as a rule strongly acidic, the pH value of the suspension is kept substantially constant during the precipitation by simultaneous addition of bases. Any inorganic or organic base which does not adversely affect the product can in principle be used. Examples of suitable bases are ammonia (in solution or as a gas), sodium hydroxide solution and potassium hydroxide solution.

If the metals are precipitated as hydroxides, the base simultaneously serves as the precipitating agent. In the case of precipitation as the carbonate or phosphate, the corresponding anion is metered in at the same time as the solution of the metal salts and the base. Precipitation as the phosphate is particularly preferably carried out, in which case alkali metal phosphates, for example, $NaH_2PO_4$, are simultaneously added. For formation of the carbonates, the carbonate ions are generally added in the form of alkali metal or ammonium carbonates or bicarbonates.

These precipitating agents are preferably added in excess, which can be, for example, about 20% of the theoretical amount. In the deposited precipitates, mixtures of anions will be obtained for both the carbonate and phosphate salts in conventional dependence upon the pH-dependent equilibria for the carbonate/bicarbonate and phosphate/monohydrogenphosphate/dihydrogen phosphate systems, as is well known. All possible relative proportions in each of the mixture systems are equivalents for use in this invention.

The second coating is preferably produced at a slightly elevated temperature of about 30°–70° C., in particular at about 40°–50° C. Coating with methacrylatochromium chloride is preferably carried out at a temperature of about 40° C.

The metal compounds used in the coating are employed in amounts whereby the second coating makes up about 0.1–10% by weight of the total mica pigments. 0.2–5% by weight is preferred. The second coating of this invention in all cases contains a content of a chromium-III compound. As a rule, the second coating contains about 20 to about 80% by weight of the chromium compound, preferably about 40 to 60% by weight.

Iron compounds and manganese compounds, which are employed either in the divalent or in the trivalent form, can together make up the remaining proportion of the second coating, any desired mixing ratios being possible. However, for reasons of practicability, as a rule, only one other metal compound is used in the second coating besides chromium.

The metal compounds can be precipitated together, so that their distribution in the second coating is substantially homogeneous. However, it is also possible to deposit the various metal compounds in succession. The metal compounds are preferably deposited together.

When the second coating stage has ended, the pigment is as a rule then left in the suspension for a short time, while stirring, and is subsequently separated off in the customary manner, if necessary also washed free of salts, and then dried at temperatures of about 80°–150° C. Calcining no longer takes place.

Unless indicated otherwise herein, the preparation of the pigments of this invention is fully conventional as disclosed in the many documents incorporated above.

Thereafter, the pigments are suitable for all the customary uses. They are particularly suitable for applications in which they are incorporated into paints, lacquers or plastics for use in the open air.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

100 ml of an aqueous solution containing 0.92 g of $FeSO_4.7H_2O$ and 1.7 g of $KCr(SO_4)_2.12H_2O$ and 100 ml of an aqueous solution containing 1.5 g of $NaH_2PO_4.2H_2O$ are added to a suspension of 100 g of a silvery rutile-mica pigment (prepared according to Example 2 of German Offenlegungsschrift No. 2,533,572 in 1 liter of water a a pH of pb 4.5 and at a temperature of 50° C. in the course of one hour, the pH being kept constant by simultaneous addition of 2% sodium hydroxide solution. The pH is then raised to 5.0, stirring is continued for another hour and the pigment is then filtered off, washed with water and dried at 130° C. A soft, agglomerate-free, densely coated pigment of almost unchanged luster and color shade in comparison with the starting pigment is obtained. The second coating makes up about 1% of the total pigment.

A weathering test shows that the pigment provided with a second coating according to the invention is clearly superior to the starting pigment.

EXAMPLE 2

Example 1 is repeated, but the equivalent amount of $MnSO_4.H_2O$ is employed instead of $FeSO_4.7H_2O$. In this case also, a pigment is obtained which has about 1% of a second coating, corresponds to the starting pigment in luster and color shade but is clearly superior in respect of stability to weathering.

EXAMPLE 3

100 ml of an aqueous solution containing 1.5 g of $FeSO_4.7H_2O$ and 0.5 g of methacrylato-chromium chloride and 100 ml of an aqueous solution containing 1.5 g of $NaH_2PO_4.2H_2O$ are added to a suspension of 100 g of a mica pigment coated with rutile and having a yellow interference color (prepared according to Example 2 of German Offenlegungsschrift No. 2,522,572), in 1 liter of water at a pH of 4.5 and at a temperature of 40° C. in the course of one hour, the pH being kept constant by simultaneous addition of 2% sodium hydroxide solution. The pH is then raised to 5.0 and stirring is continued for another hour. The pigment is then filtered off, washed with water and dried at 120° C. A soft agglomerate-free densely coated pigment is obtained which is clearly more stable to weathering than the starting pigment and which is provided with about 1% of the second coating according to the invention.

EXAMPLE 4

Example 3 is repeated, but the equivalent amount of $MnSO_4.H_2O$ is used instead of $FeSO_4.7H_2O$. In this case also, a pigment with a clearly improved stability to weathering and about 1% of a second coating is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nacreous pigment having good weathering stability, comprising a mica flake substrate coated with a first metal oxide layer and, thereon, a second layer comprising a chromium salt and one or both of a manganese salt and an iron salt, wherein the iron and manganese are deposited on the first-layer-containing pigments in the form of the hydroxide, carbonate or phosphate and the chromium is deposited on the first-layer-containing pigments in the form of the hydroxide, carbonate or phosphate or as methacrylato-chromium chloride.

2. A nacreous pigment of claim 1, wherein the second coating comprises 0.1–10% of the pigment weight.

3. A nacreous pigment of claim 1 wherein the content of chromium compound in the second coating is about 20 to about 80% by weight.

4. A nacreous pigment of claim 1 wherein the metals in the second layer are in the form of their phosphates.

5. A nacreous pigment of claim 1 wherein the iron or manganese is in the form of the phosphate and the chromium is in the form of methacrylato-chromium chloride.

6. A nacreous pigment of claim 1 wherein the second layer consists essentially of a chromium salt and one of a manganese salt and an iron salt.

7. A nacreous pigment of claim 1 wherein the first layer consists essentially of titanium or zirconium oxides or oxide hydrates.

8. A nacreous pigment of claim 1 wherein the diameter of the mica flakes is about 5–200 μm and their thickness is 0.1–5 μm.

9. A nacreous pigment of claim 1 prepared by a process comprising adding iron or manganese, and chromium, in the form of salt solutions and at a pH of 2 to 8, to an aqueous suspension of a mica flake pigment coated with a first metal oxide layer, precipitating the metal salts on the mica flake pigments and then separating off and drying the resultant pigments.

10. A nacreous pigment of claim 9, wherein the pH value is kept substantially constant at 4–7.

11. A nacreous pigment of claim 9 wherein the metal salts are precipitated together.

12. A nacreous pigment of claim 9 wherein the metal salts are precipitated by simultaneous addition of an alkali metal phosphate solution.

13. A nacreous pigment of claim 9 wherein the precipitation is carried out at a temperature of about 30°–70° C.

14. In a composition comprising a base ingredient and an effective amount of a nacreous pigment, the improvement wherein the nacreous pigment is that of claim 1.

* * * * *